US008379879B2

(12) United States Patent
Chang et al.

(10) Patent No.: US 8,379,879 B2

(45) Date of Patent: Feb. 19, 2013

(54) ACTIVE NOISE REDUCTION SYSTEM

(75) Inventors: Cheng-Yuan Chang, Chung Li (TW); Sheng-Ting Li, Chung Li (TW)

(73) Assignee: Chung Yuan Christian University, Chung Li (TW)

( * ) Notice: Subject to any disclaimer, the term of this patent is extended or adjusted under 35 U.S.C. 154(b) by 309 days.

(21) Appl. No.: 12/784,700

(22) Filed: May 21, 2010

(65) Prior Publication Data

US 2011/0194708 A1 Aug. 11, 2011

(30) Foreign Application Priority Data

Feb. 11, 2010 (TW) ............................... 99104372 A

(51) Int. Cl.
*H04B 15/00* (2006.01)

(52) U.S. Cl. ..................... 381/94.2; 381/94.3; 381/94.4; 381/94.5; 381/94.6; 381/94.7; 381/71.11; 381/71.4; 381/71.2; 381/71.12; 381/56; 381/57; 381/58; 381/59; 704/226; 704/233

(58) Field of Classification Search ........ 381/94.2–94.7, 381/71.11, 71.4, 71.2, 71.12, 56–59; 708/322, 708/372; 704/226, 233
See application file for complete search history.

(56) References Cited

U.S. PATENT DOCUMENTS 4,038,536 A * 7/1977 Feintuch ....................... 708/322
5,131,047 A * 7/1992 Hashimoto et al. ........ 381/71.11
5,182,774 A * 1/1993 Bourk .......................... 381/71.6
5,590,205 A * 12/1996 Popovich ................... 381/71.11
6,278,786 B1 * 8/2001 McIntosh ..................... 381/71.6
6,665,410 B1 * 12/2003 Parkins ........................ 381/71.1
7,885,417 B2 * 2/2011 Christoph .................. 381/71.11
2008/0181422 A1 * 7/2008 Christoph .................... 381/73.1

OTHER PUBLICATIONS

Oshchorn et al, Adaptive 60 Hz Noise Cancellation, web archive, Dec. 20, 2008.*
Kuo et al, Adaptive Active Noise Control for Headphones Using the TMS320C3ODSP, Jan. 1997.*
Stefano et al, Efficient FPGA Implementation of an Adaptive Noise Canceller, IEEE, 2005.*
Gan et al, Integrated Headsets Using the Adaptive Feedback Active Noise Control System, 8 th International Congres on Sound and Vibration, Jul. 2001, Hong kong.*
Gan et al, Adaptive Feedback Active Noise Control Headset Implementation, Evaluation and its Extension, IEEE 2005.*

* cited by examiner

*Primary Examiner* — Davetta W. Goins
*Assistant Examiner* — Kuassi Ganmavo
(74) *Attorney, Agent, or Firm* — Rosenberg, Klein & Lee

(57) ABSTRACT

An active noise reduction system is provided for receiving an audio input signal and a noise interference signal and calculating an audio broadcasting signal according to a Feedback Filtered-X Least-Mean-Square (FFXLMS) algorithm, wherein the FFXLMS algorithm optimizes a (convergence factor) μ so as to decrease the numbers of divisions operated by the active noise reduction system and increase the operation speed of the active noise reduction system.

24 Claims, 3 Drawing Sheets

| Function Group | Function | Numbers of Execution Cycle |
|---|---|---|
| Basic Floating Point Function | Addition | 122 |
| | Subtraction | 124 |
| | Multiplication | 109 |
| | Division | 361 |
| Basic Integer Function | Addition | 1 |
| | Subtraction | 1 |
| | Multiplication | 1 |
| | Division | 18 |

FIG.3

ACTIVE NOISE REDUCTION SYSTEM

This application claims the benefit of Taiwan Patent Application Serial No. 099104372, filed on Feb. 11, 2010, the subject matter of which is incorporated herein by reference.

FIELD OF THE INVENTION

The present invention relates to a noise reduction system, and more particularly relates to an active noise reduction system.

BACKGROUND OF THE INVENTION

Due to the rapid development in the electronic technology, almost everyone has an MP3 player. Moreover, most mobile phones are installed with functions of an MP3 player so that users can enjoy music wherever and whenever they want. However, the MP3 player is mostly used when users commute or go out; as a result, music is often badly affected by background noises outside and the quality of music is also degraded.

Most users raise the volume of the music up to decrease the ratio between noise and music so as to ignore the background noise, which makes them stay in an environment of high decibel such that the users hearing can be damaged.

Therefore, many researches are doing researches in order to decrease the level of noise. In general, methods for decreasing noises are in two groups—one is passive noise reduction and the other is active noise reduction. The method of passive noise reduction absorbs and blocks noises away by means of concrete materials. For example, in the prior art, hard materials of the outer shell of a conventional earpiece are used for sound isolation while soft materials of the inner part of the conventional earpiece are used for sound absorption.

The method of active noise reduction counterbalances noises by digital processing, i.e., outputting a waveform of which the frequency is the same as that of noises, and the phase is different but the amplitude is the same as that of noises. There have been many algorithms being developed for the method of active noise reduction. To control an active noise reduction system by means of adaptive algorithms is commonly known. Among the adaptive algorithms, the Least-Mean-Square (LMS) algorithm is put into use the most extensively.

However, it is found that when applying the LMS algorithm in the prior art, the secondary pathway is included among the noise source, speaker, and microphone for receiving the noise. A system may become instable if the effect of a function of a transfer of the secondary pathway is neglected when the conventional LMS algorithm is applied. Thus, a Feedback Filtered-X Least-Mean-Square algorithm is developed for an active noise reduction system in the prior art.

Referring to FIGS. 1 and 2, wherein FIG. 1 is a schematic drawing of an active noise reduction system while FIG. 2 is a drawing of a structure of an active noise reduction system using a FFXLMS algorithm. An active noise reduction system 100 in the prior art receives an audio input signal a(n) and a noise interference signal d(n), and calculates an audio broadcasting signal y(n) according to the FFXLMS algorithm, wherein the active noise reduction system 100 includes a microphone for receiving the noise interference signal d(n) and a speaker for broadcasting the audio broadcasting signal y(n). Furthermore, the audio input signal a(n) is sent from an electronic device into the active noise reduction system 100.

The active noise reduction system 100 includes:

A first operation unit 11 for receiving the audio input signal a(n) and the audio broadcasting signal y(n), a first reference signal y2(*n*) being analyzed with an analytic function of y2(*n*)=y(n)+a(n);

A first error operation unit 12 for receiving the noise interference signal d(n) and the audio broadcasting signal y(n), a first error signal e(n) being analyzed with an analytic function of $$e(n) = d(n) - \sum_{m=0}^{M-1} Sm * y2(n-m);$$

a second error operation unit 13 for receiving the first error signal e(n) and the audio input signal a(n), a second error signal e2(*n*) being analyzed with an analytic function of $$e2(n) = e(n) + \sum_{m=0}^{M-1} Sm' a(n-m);$$

a second operation unit 14 for receiving the second error signal e2(*n*) and the audio broadcasting signal y(n), a first noise prediction signal x(n) being analyzed with an analytic function of $$x(n) = e2(n) + \sum_{m=0}^{M-1} Sm' y(n-m);$$

a first adaptive operation unit 15 for receiving the first noise prediction signal x(n), the audio broadcasting signal y(n) being analyzed with an analytic function of $$y(n) = \mu \sum_{l=0}^{L-1} \overline{Wl(n)} x(n-l),$$

and a second adaptive operation unit 16 for receiving the first noise prediction signal x(n), a second noise prediction signal x'(n) being analyzed with analytic function of $$x'(n) \equiv \sum_{m=0}^{M-1} Sm' x(n-m),$$

wherein S'm and Wl are functions of a Least-Mean-Square algorithm, the definition of S'm being S'm(n+1)=S'm(n)+μa(n−m)e2(*n*), m=0, 1, . . . , M−1, and the definition of Wl being Wl(n+1)=Wl(n)+μx'(n−l)e2(*n*), l=0, 1, . . . , L−1, wherein μ is a convergence factor.

However, since the convergence factor μ is usually a floating point number smaller than 1, the conventional active noise reduction system 100 needs a more powerful controller such as a Digital Signal Processing (DSP) or an Application-Specific Integrated Circuit (ASIC); otherwise, it takes too much time in running a floating point operation virtually.

For example, referring to FIG. 3, a table showing work cycle needed by a microcontroller unit (MCU) controller for basic floating point operations and basic integral number operations if the active noise reduction system 100 using the FFXLMS algorithm is utilized and the controller is a microcontroller unit (MCU), which is simpler and cheaper.

Take a MCU of a working frequency of 40 MHz for example. One of its working cycles is 0.025 uS. The shortest working cycle needed by the basic floating point operation is a multiplication, which is 109*0.025 uS=2.75 uS. If a sampling frequency of 10 kHz is applied in the active noise reduction system 100, each operation loop has merely an operation time of 1/10kHz=100 uS; that is, the MCU can merely run the floating point operation for 36 times.

If the active noise reduction system 100 is an active noise reduction system of n orders, the second error operation unit 13, second operation unit 14, and the second adaptive operation unit 16, which use the function of S'm for calculation, need n times of integer division in each operation loop for calculating the convergence factor μ in the function of S'm.

The first adaptive operation unit 15, which uses the function of Wl for calculation, needs n times of integer division for calculating the convergence factor μ in the function of Wl in each operation loop.

It is known from the above that only lower order of LMS algorithm S'm and Wl can be adopted for calculating when a simple controller such as an MCU is applied in the active noise reduction system 100 using the FFXLMS algorithm. However, the noise reduction of the active noise reduction system 100 is not good.

Based on the above facts, since the convergence factor μ is usually a floating point number smaller than 1, the conventional active noise reduction system 100 using the FFXLMS algorithm needs to run a huge amount of floating point number operations. Although a more powerful controller such as a DSP or an ASIC can directly run a floating point number operation, it is more expensive and the costs of the active noise reduction system 100 increases.

On the contrary, although a cheaper controller such as a MCU can lower the costs, this kind of controller cannot directly run a floating point number operation—floating point numbers needed are indirectly generated through a division. As a result, the operation takes too long and only lower order of LMS algorithm can be used, which results in the bad quality of noise reduction of the active noise reduction system 100.

SUMMARY OF THE INVENTION

The present invention relates to a noise reduction system, and more particularly relates to an active noise reduction system. The active noise reduction system is to reduce the number of operations on floating point number of the FFXLMS algorithm such that when the active noise reduction system uses a controller which cannot run an operation of floating point number, the operation time of the controller used is reduced.

The present invention provides an active noise reduction system for receiving an audio input signal and a noise interference signal and calculating an audio broadcasting signal according to a FFXLMS algorithm, wherein the active noise reduction system optimizes the convergence factor μ of the FFXLMS algorithm such that the active noise reduction system runs less divisions and increases operation speed.

Compared with the active noise reduction system of the prior art, the active noise reduction system of the present invention optimizes the convergence factor μ of the FFXLMS algorithm such that the active noise reduction system runs less floating point number operations. Therefore, when the active noise reduction system uses a controller which cannot run an operation of floating point number, the operation time of the controller used is reduced, and the order of LMS is increased so that the noise reduction is improved.

In other words, the active noise reduction system of the present invention uses a controller which cannot run an operation of floating point number, and lower the costs.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principals of the present invention.

FIG. 3 is a table showing work cycle needed by an MCU controller for basic floating point operations and basic integral number operations.

DETAILED DESCRIPTION OF THE PREFERRED EMBODIMENTS

The present invention relates to a noise reduction system, and more particularly relates to an active noise reduction system. Two preferable embodiments of the present invention are as following. It is a common understanding for persons having ordinary skill in the art that these preferable embodiments are examples of the present invention and should not limit the invention itself.

Figure 1:
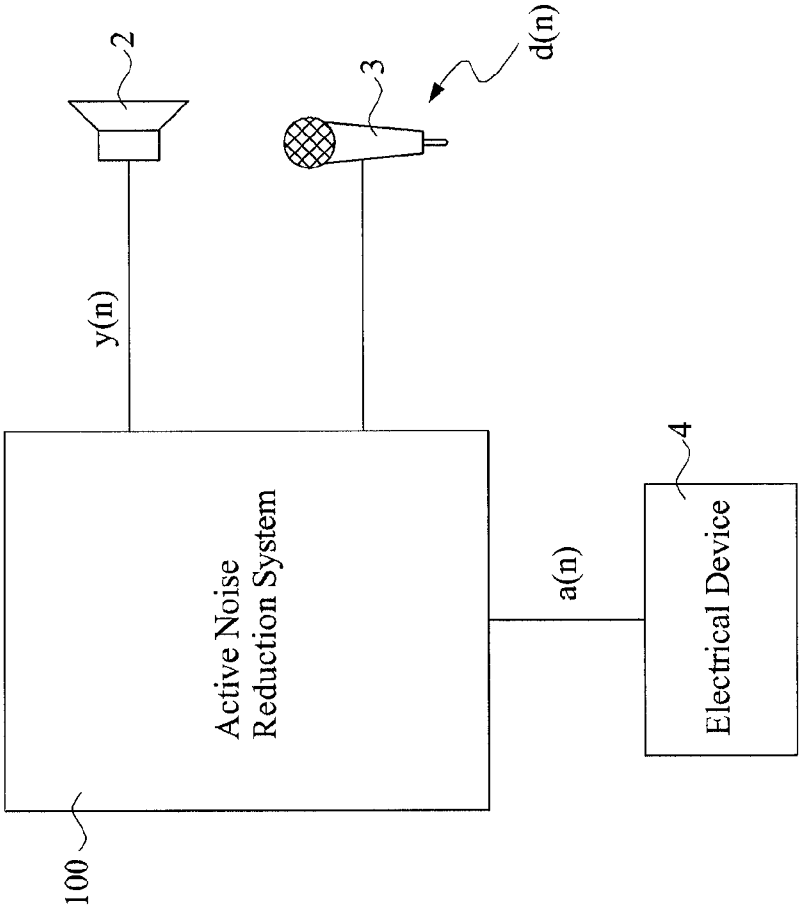
FIG. 1 is a schematic drawing of an active noise reduction system of the prior art.
Figure 2:
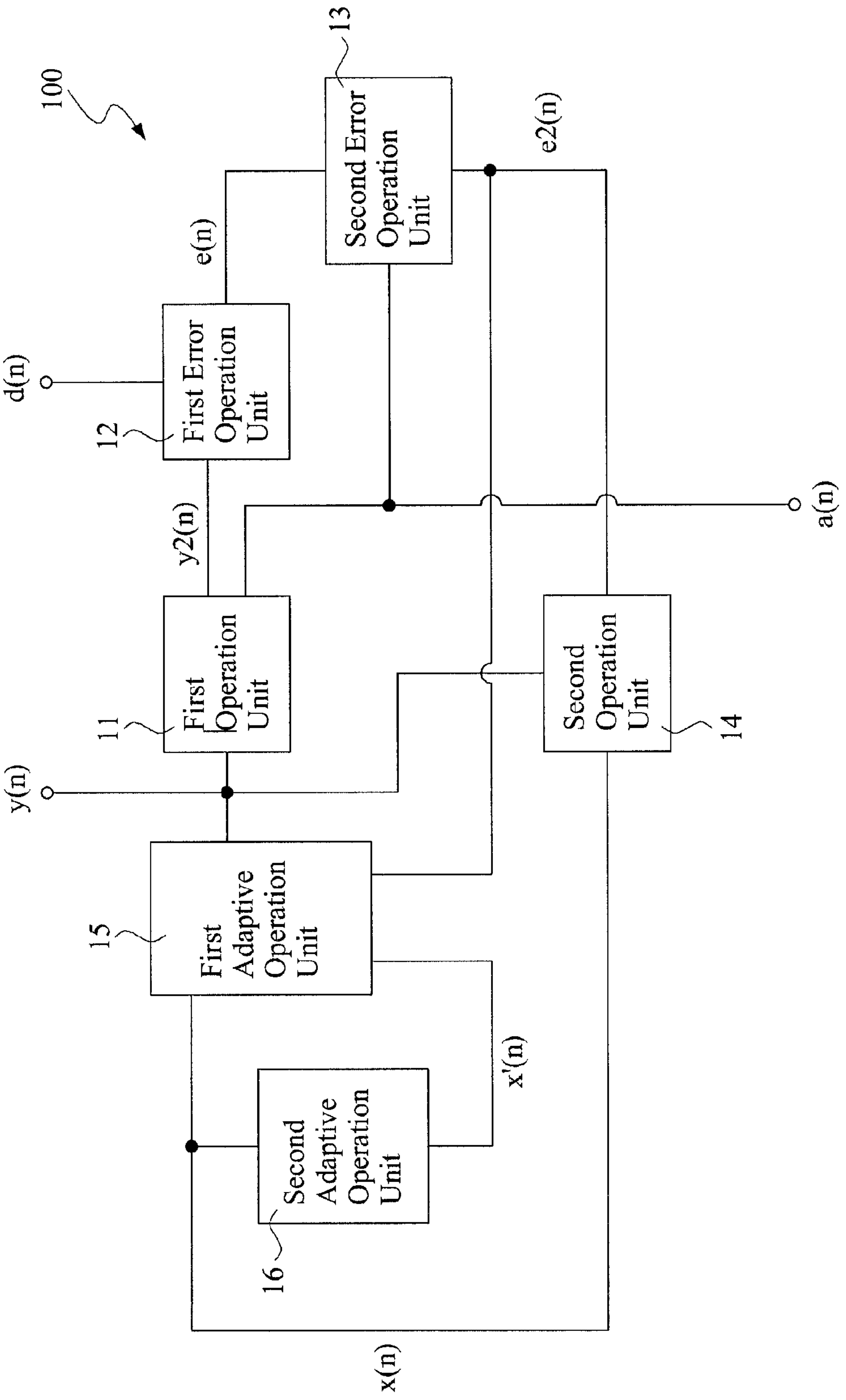
FIG. 2 is a drawing of a structure of an active noise reduction system of the prior art using an FFXLMS algorithm.

Referring to FIG. 2, the active noise reduction system 100 of the present invention optimizes the convergence factor μ of the FFXLMS algorithm. A first embodiment of the active noise reduction system 100 is used for receiving an audio input signal a(n) and a noise interference signal d(n) and calculating an audio broadcasting signal y(n) according to the FFXLMS algorithm, wherein when the audio input signal a(n)=0, the active noise reduction system 100 performs a noise reduction merely on the noise interference signal d(n).

The active noise reduction system 100 of the present invention includes a first operation unit 11, a first error operation unit 12, a second error operation unit 13, a second operation unit 14, a first adaptive operation unit 15, and a second adaptive operation unit 16.

The first operation unit 11 is used for receiving the audio input signal a(n) and the audio broadcasting signal y(n), and a first reference signal y2($n$) is analyzed with an analytic function of y2($n$)=y(n)+a(n), wherein the first operation unit 11 is an adder.

The first error operation unit 12 is used for receiving the noise interference signal d(n) and the audio broadcasting signal y(n), and a first error signal e(n) is analyzed with an analytic function of $$e(n) = d(n) - \sum_{m=0}^{M-1} Sm * y2(n-m),$$

wherein the first error operation unit 12 includes at least a subtractor, at least an adder, and at least a multiplier.

The second error operation unit 13 is used for receiving the first error signal e(n) and the audio input signal a(n), and a second error signal e2($n$) is analyzed with an analytic function of $$e2(n) = e(n) + \sum_{m=0}^{M-1} Sm' a(n-m),$$

wherein the second error operation unit 13 includes at least an adder and at least a multiplier.

The second operation unit 14 is used for receiving the second error signal e2(*n*) and the audio broadcasting signal y(n), and a first noise prediction signal x(n) is analyzed with an analytic function of $$x(n) = e2(n) + \sum_{m=0}^{M-1} Sm' y(n-m),$$

wherein the second operation unit 14 includes at least an adder and at least a multiplier The first adaptive operation unit 15 is used for receiving the first noise prediction signal x(n), and the audio broadcasting signal y(n) is analyzed with an analytic function of $$y(n) = \mu \sum_{l=0}^{L-1} \overline{Wl(n)} x(n-l),$$

wherein μ is a convergence factor of the LMS algorithm and the first adaptive operation unit 15 includes at least an adder and at least a multiplier.

The second adaptive operation unit 16 is used for receiving the first noise prediction signal x(n), and a second noise prediction signal x'(n) is analyzed with analytic function of $$x'(n) \equiv \sum_{m=0}^{M-1} Sm' x(n-m),$$

wherein the second adaptive operation unit 16 includes at least an adder and at least a multiplier.

The S'm and Wl are functions of the LMS algorithm. The definition of S'm is $S'm(n+1)=S'm(n)+\mu a(n-m)e2(n)$ and the definition of Wl is $\overline{Wl(n+1)}=\overline{Wl(n)}+x'(n-l)e2(n)$.

According to the active noise reduction system 100 of the present invention, the first adaptive operation unit 15 uses the analytic function of $$y(n) = \mu \sum_{l=0}^{L-1} \overline{Wl(n)} x(n-l).$$

If the active noise reduction system 100 is an active noise reduction system of n orders, the first adaptive operation unit 15, which uses the function of $\overline{Wl}$ for calculation, merely needs one time of integer division for calculating the convergence factor μ in each operation loop.

In comparison, the first adaptive operation unit 15 needs n times of integer division for calculating the convergence factor μ in the function of Wl in each operation loop in the conventional active noise reduction system 100 using conventional FFXLMS algorithm, in terms of an active noise reduction system of n orders, while only one integer division is needed according to the first embodiment of the present invention. If an MCU controller is applied in the active noise reduction system 100, each operation loop saves the time for integer division for n−1 times.

According to a second embodiment of the present invention, the analytic function of the second error operation unit 13 is $$e2(n) = e(n) + \mu \sum_{m=0}^{M-1} \overline{Sm'} a(n-m),$$

the analytic function of the second operation unit 14 is $$x(n) = e2(n) + \mu \sum_{m=0}^{M-1} \overline{Sm'} y(n-m),$$

the analytic function of the first adaptive operation unit 15 is $$y(n) = \sum_{l=0}^{L-1} Wl(n) x(n-l),$$

and the analytic function of the second adaptive operation unit 16 is $$x'(n) \equiv \mu \sum_{m=0}^{M-1} \overline{Sm'} x(n-m),$$

wherein S'm and Wl are functions of the LMS algorithm, the definition of S'm being $\overline{S'm(n+1)}=\overline{S'm(n)}+a(n-m)e2(n)$ and the definition of Wl being $Wl(n+1)=Wl(n)+\mu x'(n-l)e2(n)$, It is obvious that, if the active noise reduction system 100 is an active noise reduction system of n orders, the second error operation unit 13, the second operation unit 14, and the second adaptive operation unit 16, which use the function of $\overline{Sm'}$ for calculation, need only one time of integer division in each operation loop for calculating the convergence factor μ. In other words, all operation units which use the function of $\overline{Sm'}$ for calculation merely need to run integer division for three times in order to calculate the convergence factor μ.

In comparison, the second error operation unit 13, the second operation unit 14, and the second adaptive operation unit 16 need n times of integer division in each operation loop for calculating the convergence factor μ in the function of S'm in the conventional active noise reduction system 100 using conventional FFXLMS algorithm, in terms of an active noise reduction system of n orders, while only three integer divisions are needed according to the second embodiment of the present invention. If a MCU controller is applied in the active noise reduction system 100, each operation loop saves the time for integer division for n−3 times.

Furthermore, according to the present invention, all analytic functions using the convergence factor μ can be optimized in the conventional active noise reduction system 100 using conventional FFXLMS algorithm. Thus, when compared with the prior art, the active noise reduction system 100 of the present invention can save the time for integer division for at least (n−1)+(n−3)=2n−4 times.

Based on the above facts, the active noise reduction system 100 of the present invention optimizes the convergence factor μ of the FFXLMS algorithm such that the active noise reduction system runs less floating point number operations. Therefore, when the active noise reduction system 100 uses a controller which cannot run an operation of floating point number, the operation time of the controller used is reduced, and the order of LMS is increased so that the noise reduction is improved.

In other words, the active noise reduction system 100 uses a controller which cannot run an operation of floating point number, and lower the costs.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An active noise reduction system having a microcontroller unit (MCU) for receiving an audio input signal a(n) and a noise interference signal d(n) and calculating an audio broadcasting signal y(n) according to a Feedback Filtered-X Least-Mean-Square algorithm, the active noise reduction system comprising:

a first operation unit for receiving the audio input signal a(n) and the audio broadcasting signal y(n), a firs reference signal y2(*n*) being analyzed with an analytic function of y2(*n*)=y(n)+a(n);

a first error operation unit for receiving the noise interference signal d(n) and the audio broadcasting signal y(n), a first error signal e(n) being analyzed with an analytic function of $$e(n) = d(n) - \sum_{m=0}^{M-1} Sm * y2(n-m);$$

a second error operation unit for receiving the first error signal e(n) and the audio input signal a(n), a second error signal e2(*n*) being analyzed with an analytic function of $$e2(n) = e(n) + \sum_{m=0}^{M-1} Sm' a(n-m);$$

a second operation unit for receiving the second error signal e2(*n*) and the audio broadcasting signal y(n), a first noise prediction signal x(n) being analyzed with an analytic function of $$x(n) = e2(n) + \sum_{m=0}^{M-1} Sm' y(n-m);$$

a first adaptive operation unit for receiving the first noise prediction signal x(n), the audio broadcasting signal y(n) being analyzed with an analytic function of $$y(n) = \mu \sum_{l=0}^{L-1} \overline{Wl(n)} x(n-l),$$

wherein μ is a convergence factor; and a second adaptive operation unit for receiving the first noise prediction signal x(n), a second noise prediction signal x'(n) being analyzed with analytic function of $$x'(n) \equiv \sum_{m=0}^{M-1} Sm' x(n-m),$$

wherein S'm and Wl are functions of a Least-Mean-Square algorithm, the definition of S'm being S'm(n+1)=S'm (n)+μa(n−m)e2(*n*) and the definition of Wl being $\overline{Wl(n+1)}=\overline{Wl(n)}$+x'(n−1)e2(*n*), Sm being a function of a sound field transfer caused during a sound conduction of the active noise reduction system.

2. The active noise reduction system according to claim 1, further comprising a microphone for receiving the noise interference signal d(n).

3. The active noise reduction system according to claim 1, further comprising a speaker for broadcasting the audio broadcasting signal y(n).

4. The active noise reduction system according to claim 1, wherein the noise interference signal d(n) comprises at least one of echoes generated by a background noise and the audio broadcasting signal y(n).

5. The active noise reduction system according to claim 1, wherein the audio input signal a(n) is sent from an electronic device.

6. The active noise reduction system according to claim 1, wherein when the audio input signal a(n)=0, the active noise reduction system performs a noise reduction merely on the noise interference signal d(n).

7. The active noise reduction system according to claim 1, wherein the first operation unit comprises an adder.

8. The active noise reduction system according to claim 1, wherein the first error operation unit is selected from the group of at least a subtractor, at least an adder, and at least a multiplier.

9. The active noise reduction system according to claim 1, wherein the second error operation unit comprises at least an adder and at least a multiplier.

10. The active noise reduction system according to claim 1, wherein the second operation unit comprises at least an adder and at least a multiplier.

11. The active noise reduction system according to claim 1, wherein the first adaptive operation unit comprises at least an adder and at least a multiplier.

12. The active noise reduction system according to claim 1, wherein the second adaptive operation unit comprises at least an adder and at least a multiplier.

13. An active noise reduction system having a microcontroller unit (MCU) for receiving an audio input signal a(n) and a noise interference signal d(n) and calculating an audio broadcasting signal y(n) according to an algorithm of Feedback Filtered-X Least-Mean-Square, the active noise reduction system comprising:

a first operation unit for receiving the audio input signal a(n) and the audio broadcasting signal y(n), a first reference signal y2(*n*) being analyzed with an analytic function of y2(*n*)=y(n)+a(n);

a first error operation unit for receiving the noise interference signal d(n) and the audio broadcasting signal y(n), a first error signal e(n) being analyzed with an analytic function of $$e(n)=d(n)-\sum_{m=0}^{M-1} Sm*y2(n-m);$$

a second error operation unit for receiving the first error signal e(n) and the audio input signal a(n), a second error signal e2(*n*) being analyzed with an analytic function of $$e2(n)=e(n)+\mu\sum_{m=0}^{M-1}\overline{Sm'}a(n-m),$$

wherein μ is a convergence factor;

a second operation unit for receiving the second error signal e2(*n*) and the audio broadcasting signal y(n), a first noise prediction signal x(n) being analyzed with an analytic function of $$x(n)=e2(n)+\mu\sum_{m=0}^{M-1}\overline{Sm'}y(n-m);$$

a first adaptive operation unit for receiving the first noise prediction signal x(n), the audio broadcasting signal y(n) being analyzed with an analytic function of $$y(n)=\sum_{l=0}^{L-1} Wl(n)x(n-l);$$

and a second adaptive operation unit for receiving the first noise prediction signal x(n), a second noise prediction signal x'(n) being analyzed with analytic function of $$x'(n)\equiv\mu\sum_{m=0}^{M-1}\overline{Sm'}x(n-m),$$

wherein S'm and Wl are functions of a Least-Mean-Square algorithm, the definition of S'm being $\overline{S'm(n+1)}=\overline{S'm(n)}+a(n-m)e2(n)$ and the definition of Wl being $Wl(n+1)=Wl(n)+\mu x'(n-1)e2(n)$, Sm being a function of a sound field transfer caused during a sound conduction of the active noise reduction system.

14. The active noise reduction system according to claim 13, further comprising a microphone for receiving the noise interference signal d(n).

15. The active noise reduction system according to claim 13, further comprising a speaker for broadcasting the audio broadcasting signal y(n).

16. The active noise reduction system according to claim 13, wherein the noise interference signal d(n) comprises at least one of echoes generated by a background noise and the audio broadcasting signal y(n).

17. The active noise reduction system according to claim 13, wherein the audio input signal a(n) is sent from an electronic device.

18. The active noise reduction system according to claim 13, wherein when the audio input signal a(n)=0, the active noise reduction system performs a noise reduction merely on the noise interference signal d(n).

19. The active noise reduction system according to claim 13, wherein the first operation unit comprises an adder.

20. The active noise reduction system according to claim 13, wherein the first error operation unit is selected from the group of at least a subtractor, at least an adder, and at least a multiplier.

21. The active noise reduction system according to claim 13, wherein the second error operation unit comprises at least an adder and at least a multiplier.

22. The active noise reduction system according to claim 13, wherein the second operation unit comprises at least an adder and at least a multiplier.

23. The active noise reduction system according to claim 13, wherein the first adaptive operation unit comprises at least an adder and at least a multiplier.

24. The active noise reduction system according to claim 13, wherein the second adaptive operation unit comprises at least an adder and at least a multiplier.

* * * * *